United States Patent Office 3,642,847
Patented Feb. 15, 1972

3,642,847
COORDINATED COMPLEXES OF NITROGENOUS COMPOUNDS
Ferdinand P. Otto, Woodbury, and Andreas Logothetis, Haddonfield, N.J., assignors to Mobil Oil Corporation
No Drawing. Continuation-in-part of application Ser. No. 585,253, Oct. 10, 1966. This application Mar. 24, 1970, Ser. No. 22,398
Int. Cl. C10m 1/40; C07f 3/06, 15/04
U.S. Cl. 260—429.9
14 Claims

ABSTRACT OF THE DISCLOSURE

Metal complexes useful as additives in industrial fluids to improve the detergency and neutralizing characteristics thereof are produced by reacting a metal salt of an acid with an organic nitrogen compound. The specific metal complexes of the invention are formed by reacting an alkylene polyamine with an aldehyde, followed by reacting this product with (1) the metal salt and (2) an alkenylsuccinic acid or aldehyde in the order 1, 2 or 2, 1.

CROSS-REFERENCE TO RELATED APPLICATIONS

This application is a continuation-in-part of pending U.S. application Ser. No. 585,253, filed Oct. 10, 1966.

BACKGROUND OF THE INVENTION

Field of the invention

This invention relates to stabilized organic compositions containing novel additives and in particular this invention relates to organic compositions containing metal complexes.

Discussion of the prior art

It is known that in the normal use of organic industrial fluids, such as lubricating oils, transmission fluids, bearing lubricants, power transmitting fluids and the like, the base medium is subjected to oxidizing conditions which may result in the formation of sludge, lacquers, corrosive acids, and the like. These products are undesirable in the equipment in which the industrial fluid is used. The oxidation residues or heavy contaminants may interfere with the normal operation of the fluid, increase its viscosity, and even cause severe damage to the parts of the equipment themeselves.

In the lubrication of modern engines, particularly, oil compositions must be able to prevent acids, sludge and other solid contaminants from remaining near the moving metal parts. Poor piston travel and excessive engine bearing corrosion may result, unless the oil can prevent the sludge and oxidation products from depositing in the engine. Bearing corrosion is another serious problem in gasoline engines which operate at an oil temperature of about 300° F. or higher.

The most desirable way of decreasing these difficulties is to add to the base organic fluid a detergent or dispersant additive capable of dispersing the solid particles to prevent them from interfering with the normal operation of the equipment, and leaving the metal surfaces relatively clean. Today, with modern equipment operating under increasingly strenuous conditions, it is desirable to develop new detergents which have improved dispersant properties, which are soluble in the fluid medium to which they are added, and which are themselves stable therein.

SUMMARY OF THE INVENTION

In accordance with this invention, there is provided a coordinated metal complex product prepared by reacting a basic nitrogen compound having at least one basic nitrogen atom, said basic nitrogen compound being formed by reacting a polyamine of the formula $H_2N(R'NH)_zH$ wherein $R'$ is alkylene of from 2 to 5 carbon atoms and $z$ is from 1 to 10, with an aldehyde having from 1 to about 30 carbon atoms, with (1) An alkenylsuccinic acid or anhydride wherein the alkenyl portion is derived from a hydrocarbon containing from 8 to about 300 carbon atoms, and (2) A metal salt, wherein said metal salt is made from a metal selected from the group consisting of Groups I–B, II–B, IV–A, VI–B and VIII and an acid selected from the group consisting of an organosulfonic acid, an organophosphorus-containing acid, each having from 1 to about 50 carbon atoms, sulfamic acid and a polyolefinic succinamic acid.

It will be understood from this statement of the invention that components (1) and (2) may be reacted with the polyaminealdehyde product in the order given or in the reverse order. That is to say, the order of reaction may be 1, 2 or 2, 1.

The invention further provides organic fluid compositions comprising a major proportion of an organic fluid and a minor amount of the coordinated metal complex product. When used in accordance with this invention, the metal complexes may be present in the organic fluid to the extent of from about 0.05 to about 25% by weight thereof.

DESCRIPTION OF SPECIFIC EMBODIMENTS

The preferred metal-containing reagents may be prepared as metal salts of the following acids:

(1) sulfonic acids—$HR$—$SO_3$
(2) phosphoric acids—$HR_2PO_4$ or $H_2RPO_4$
(3) phosphinic or phosphonic acids—

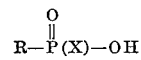

[X may be R, hydrogen or hydroxy], and
(4) sulfamic acids—$HO$—$SO_2$—$NH_2$ wherein R is an alkyl, aryl, aralkyl or alkaryl radical having from 1 to about 50 carbon atoms, and the oxygen, sulfur, and nitrogen-containing derivatives thereof. Although acid (4) is inorganic, nevertheless it shares with the other acids the ability to form the stable and useful metal complexes of this invention. Also included as organo-phosphorus metal reagents are metal salts of phosphosulfurized olefins, and polyolefins wherein the olefin and polyolefin may contain up to 300 carbon atoms.

The reaction between the organic nitrogen-component and the metal salt is conducted at a temperature ranging from about 60° to about 250° C. under atmospheric or reduced pressure conditions. Generally the mole ratio is from about 0.5 to about 2 moles of metal reagent per mole of nitrogen compound.

As indicated previously, the preferred metal-containing coordination complex reagent may be a metal salt of organosulfonic acids, organic phosphorus-containing acids, or sulfamic acids. In addition, metal salts of alkenylsuccinamic acids are useful. The organic portion of the first two groups is ordinarily a hydrocarbyl substituent having from 1 to 50 carbon atoms, and more preferably from 1 to 30 carbon atoms. The alkenyl portion of the succinamic acid is as defined elsewhere herein. The polyvalent metal salts of these acids, especially the divalent metals, provide suitable reagents for the products of this invention. The metal is preferably selected from Groups I–B, II–B, IV–A, VI–B and VIII of the Periodic Table; the acceptable metals include zinc, tin, nickel, copper, cobalt, cadmium, chromium and lead. Of these the most preferred are zinc, tin and nickel.

The organophosphorus salts include metal salts of alkyl, aryl and alkaryl phosphorus acids, such as butyl phosphate, octyl phosphate, phenyl phosphate, methylphenyl phosphate, diamylphenyl phosphate, phosphosulfurized olefins and polyolefins wherein the olefins and polyolefins may contain up to 300 carbon atoms, and the like, as well as the corresponding phosphonates and phosphinates. Organic phosphates containing two or more phosphorus atoms may also be used. Among the organo sulfonates which may be used are such sulfonates as those derived from mineral oils, and aryl sulfonates as phenylsulfonate, naphthylsulfonate, tolylsulfonate, wax-benzene sulfonate, including mono- and multi-alkyl-substituted derivatives of any of these aryl sulfonates, and the like. The preparation of these organophosphorus compounds and sulfonates are well known in the art.

The preferred alkenylsuccinic acid or anhydride is one wherein the alkenyl group is a hydrocarbon containing from 8 to about 300 carbon atoms and preferably from 40 to 200. These are produced by known techniques from an olefin or polyolefin and maleic anhydride. When this is used as the first reactant with polyamine, it is reacted with such polyamine in sufficient molar proportion to form a succinimide, or the amide, diamide or amine salts or mixtures thereof containing residual basic nitrogen atoms. In preparing the imide, the mole ratios may range from about 0.5 to about $x-1$ moles of succinic acid or anhydride per mole of polyamine, wherein $x$ is the number of nitrogen atoms in the polyamine. The olefin may be a simple alkene, such as 1-octene, 1-decene, 1-dodecene, and so forth, or it may be a polymer of such olefins as ethene, propene, 1-butene, isobutene, 1-hexene, 1-octene and so forth.

The polyamine reactant utilizable herein may be an alkylene polyamine of the structure $H_2N(R'NH)_zH$, $R'$ being a 2- to 5-carbon alkylene group, and $z$ is 1 to 10, such as triethylene tetramine, tetraethylene pentamine, di-(methylethylene) triamine, hexapropylene heptamine, and the like.

The aldehyde which may be used as reactants with the polyamines to form the so-called amine imidazolidines are any of those containing from 1 to about 30 carbon atoms. Among these are included formaldehyde, paraformaldehyde, acetaldehyde, aldol, butyraldehyde, capraldehyde, hendecanal, stearaldehyde, eicosyl aldehyde, triacontyl aldehyde, benzaldehyde, furfural, and the like. The resulting cyclic product is similar to an imidazoline (made from a polyamine and an acid), except that it contains saturated bonds.

The reaction product produced from polyamine and alkenylsuccinic acid or anhydride will contain the cyclic succinimide group

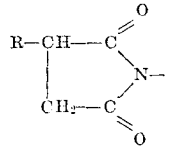

which itself may be opened by reaction in the presence of a metal compound to form the salt of the monoamide derivative

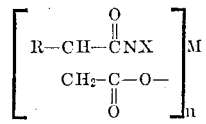

wherein M is the metal, X is the remainder of the succinimide molecule and $n$ is the valence of the metal. This salt is derived from succinamic acid and may be used as the metal complexing reagent.

The nitrogen compounds, when reacted with the metal salt, yield what is believed to be a complex of the metal salt and the organic nitrogen compound. A salt-forming reaction does not occur since there is no evidence of the anion of the metal salt producing a separate by-product. Moreover, the resulting reaction mixture upon analysis appears to be a single molecule, similar to those existing in the coordinated complexes of the Werner-type. For the purpose of this invention, therefore, the product compounds are referred to herein as coordinated complexes.

As has already been indicated, one aspect of this invention involves first reacting the imidazolidine with the metal complexing reagent to produce a metallo-imidazolidine complex intermediate. Then this intermediate is reacted with the alkenylsuccinic acid or anhydride to produce the final oil-soluble metal complex product of this invention. Since the metal-complexing reaction is quite rapid even at room temperature, and also since the oxides, hydroxides and carbonates do not form complexes with the nitrogen-containing compounds, all three reactants may be added together to produce an in situ product, by first mixing the reactants, i.e., imidazolidine, metal salt and alkenylsuccinic compound and then heating to form the succinimide derivative.

The base fluids for which the compounds of this invention find utility include gasoline, petroleum products of both lubricating and fuel viscosities, and synthetic fluids. In the latter class may be included synthetic ester lubricants, such as those formed from monohydric alcohols and dicarboxylic acids, glycols or glycerols with monocarboxylic acids, and pentaerythritols with carboxylic acids, including alcohols having from about 4 to about 20 carbon atoms, and carboxylic acids having from 2 to about 18 carbon atoms. Many synthetic esters may have mixed alcohols or carboxylic acids. Commonly may be included 2-ethylhexyl sebacate, trimethylolpropane trioctanoate, and especially pentaerythritol esters of valeric acid, isovaleric acid, caproic acid, caprylic acid, penargonic acid, capric acid, and the like. Of special interest is a mixed pentaerythritol ester of an equimolar proportion of commercial valeric acid (containing isovaleric acid) and penargonic acid. Other synthetic fluids include liquid polyolefins, alkylene oxide fluids, silicone fluids, polyacetals, and simple hydrocarbons of stable fluid viscosities.

As one aspect of this invention, it is contemplated that lubricant compositions containing these complexes will possess greater thermal stability, and will result in more effective dispersancy in high-output-high-temperature engines than can be obtained with uncomplexed nitrogen compounds.

The following examples illustrate this invention more clearly. All parts and percentages are on a weight basis unless otherwise specified.

Example 1.—In this example, the nitrogen compound is an imidazolidine. Into a suitable reaction vessel was added 27 pounds of a solvent-refined oil diluent and 4.81 pounds (11.51 moles) of tetraethylene pentamine. To this with agitation, was added 1.83 pounds (11.51 moles) of n-butyraldehyde, and the mixture was cooled to maintain the temperature below 35° C. To the resulting product was added 55.5 pounds (13.83 moles) of polybutenylsuccinic anhydride, prepared from a polybutene having a molecular weight of about 1350. After the addition, a vacuum was applied with heat maintaining conditions at 150° C. and 35 mm. Hg until 0.12 gallon of water by-product was removed. After about 1.5 hours, the reaction system was returned to atmospheric conditions by use of nitrogen gas and the temperature reduced to room temperature. The product containing 33% oil had the following analysis:

Percent
Nitrogen _____ 2.01

Example 2.—The product of Example 1 was reacted with zinc phenylphosphinate. This zinc salt was prepared in situ from zinc carbonate and phenylphosphinic acid. A mixture of 45.6 grams of the acid and 23.5 grams of zinc carbonate were refluxed in 300 ml. of distilled water for 2 hours. To this mixture were added 28 grams of process oil and 400 grams of the Example 1 product. After being refluxed and stripped under 10 mm. Hg vacuum, the product was filtered. The clear viscous product, in 33% oil diluent, had the following analysis:

| | Percent |
|---|---|
| Nitrogen | 1.45 |
| Zinc | 0.96 |
| Phosphorus | 0.74 |

Example 3.—The product of Example 1 was reacted with zinc p-toluene sulfonate. The zinc salt was prepared in situ from 46.8 grams of zinc carbonate and 103.2 grams of p-toluene sulfonic acid in 500 grams of distilled water. To this mixture were added 1050 grams of the Example 1 product and 45 grams of process oil. The mixture was refluxed and stripped under 10 mm. Hg vacuum, then filtered hot through a Buchner funnel. The filtered product, containing 33% oil diluent, had the following analysis:

| | Percent |
|---|---|
| Nitrogen | 1.62 |
| Zinc | 1.25 |
| Sulfur | 1.39 |

Example 4.—Using the general procedure of the previous examples, 800 grams of the product of Example 1 was reacted with zinc sulfamate. The zinc salt was prepared in situ from 27 grams of zinc carbonate and 58.2 grams of sulfamic acid in 400 grams of distilled water and 28.6 grams of process oil. The final filtered product, containing 33% oil, had the following analysis:

| | Percent |
|---|---|
| Nitrogen | 2.26 |
| Zinc | 1.71 |
| Sulfur | 2.09 |

Example 5.—Using the general procedure of the previous examples, 800 grams of the product of Example 1 was reacted with zinc methane sulfonate. The zinc salt was prepared in situ from 47 grams of zinc carbonate and 28.8 grams of methane sulfonic acid in 100 grams of distilled water and 30 grams of process oil. The final product had the following analysis:

| | Percent |
|---|---|
| Nitrogen | 1.91 |
| Zinc | 1.12 |
| Sulfur | 1.12 |

Example 6.—Using the general procedure of the previous examples, 400 grams of the product of Example 1 containing 18.5% oil was reacted with zinc methylphenyl phosphate. The zinc salt was prepared in situ from 50 grams of methylphenyl phosphoric acid (prepared from cresol and $P_2O_5$ in a mole ratio of 3:1) and 50.5 grams of zinc carbonate in 200 grams of xylene and 60 grams of process oil. The final product containing 25% oil, had the following analysis:

| | Percent |
|---|---|
| Nitrogen | 1.87 |
| Zinc | 2.36 |
| Phosphorus | 1.24 |

Example 7.—Using the general procedure of the previous examples, 1000 grams of the product of Example 1 containing 18.5% oil was reacted with 100 grams of zinc wax benzene high boiler sulfonate, having about 50 carbon atoms, in 200 grams of distilled water. The final product had the following analysis:

| | Percent |
|---|---|
| Nitrogen | 2.1 |
| Zinc | 0.29 |
| Sulfur | 0.22 |

EVALUATION OF PRODUCT

The metal coordinated complex products of this invention have been tested in a series of tests designated to indicate the utility of these products in lubricating oils and fuels.

(1) The sulfuric acid neutralization test

This test measures the ability of an oil additive to neutralize strong acids formed in the engine operating on sulfur containing fuels. Sulfuric acid is mixed with a heated blend of the additive and the oil in iso-octane. The solution is centrifuged to separate out insoluble material. The optical density of the clear solution is measured. From this value, the optical density of a blend of the additive applied to a corresponding amount with iso-octane is subtracted; the difference gives the optical density of dispersed sulfuric reaction products. The optical density of an acetone extraction of the iso-octane-oil solution is then determined. The average optical density of the iso-octane-oil solution is expressed as the optical density of the dispersed sulfuric acid reaction product. The average optical density of the acetone solution is expressed as the optical density of the non-dispersed sulfuric reaction products. The total of these values or either one alone is used in the evaluation of detergent additives. The lower the value of this test, the better the detergent.

(2) Pyruvic acid dispersion test

This test measures the dispersant value of an oil additive and indicates the detergent properties when used in lubricating engines operating on low sulfur compound fuels. The values of this test are taken with those of the sulfuric acid test to predict the performance of these additives. Pyruvic acid is mixed with a heated blend of the additive and oil. The mixture is diluted with benzene and centrifuged to separate the insoluble materials. The insolubles are dissolved in acetone. The optical density of the oil-benzene solution gives the total amount of color. From this value, the optical density of the initial additive blend diluted with benzene to a corresponding amount is subtracted. This corrected value is expressed as the optical density of the dispersed pyruvic acid polymer. The optical density of the acetone solution is expressed as the optical density of the non-dispersed pyruvic acid polymer. The higher the percentage of the pyruvic acid results, the better the additive.

The blends of oil tested in these two tests are produced from a solvent refined lubricating oil of S.A.E. 30 grade containing 3% active ingredient of the additive and 1% of zinc dihexylphosphorodithioate. Each blend was tested in the two tests. The results are shown in Table I below:

TABLE I

| Solution | Pyruvic acid, percent | Sulfuric acid |
|---|---|---|
| Blank | 58.6 | 0.102 |
| Blank plus product of Example 3 | 99.9 | 0.002 |
| Blank plus product of Example 4 | 97.2 | 0.000 |
| Blank plus product of Example 5 | 99.7 | 0.001 |
| Blank plus product of Example 7 | 99.8 | 0.002 |

It is thus seen that the metal complexes of this invention provide excellent detergent-dispersant properties to a lubricating oil.

It is further contemplated that these additives will be useful in fuels in preventing deposits.

As is well known, fuel oils, particularly distillate fuel oils, such as those used as domestic heating oils and diesel fuels, have a tendency to deteriorate in storage and to form sludge. Also, by the time the fuel oil reaches the consumer, it contains small amounts of foreign substances, such as condensed moisture and particles of rust and dirt, which become entrained in the oil from the tanks and pipes of the fuel distribution system. A serious problem encountered with fuel oils arises from their tendency to deposit the formed sludge and foreign bodies on the screens, filters, nozzles, etc. of burners and engines using them. These deposits cause clogging of these elements which in turn necessitates cleaning and repairs. It has been found that this clogging problem can be substantially alleviated by the addition to the fuel oil of minor amounts of chemical additives known as anticlogging agents, which have the ability to prevent these deposits. The products of the present invention will exhibit excellent anti-clogging action when added to fuel oils.

Lubricants containing the metal complexes of this invention may contain other additives which provide additional properties and aid in enhancing the performance of said lubricants. Such other additives may include, for example, antioxidants, extreme pressure agents, metal suppressants, and the like.

While the present invention has been described in considerable detail in connection with a few specific embodiments for specific purposes, it is apparent that novel compositions of this invention are not restricted to such embodiments and details, for there are many obvious modifications and variations which enhance their wide application in various types of utilization. Accordingly, the present invention should not be construed as limited in any particulars except as may be recited in the appended claims.

We claim:

1. A coordinated metal complex product prepared by reacting a basic nitrogen compound having at least one basic nitrogen atom, said basic nitrogen compound being formed by reacting a polyamine of the formula $$H_2N(R'NH)_zH$$

wherein R' is alkylene of from 2 to 5 carbon atoms and z is from 1 to 10, with an aldehyde having from 1 to about 30 carbon atoms, with (1) an alkenylsuccinic acid or anhydride wherein alkenyl portion is derived from a hydrocarbon containing from 8 to about 300 carbon atoms, and (2) a metal salt, wherein said metal salt is made from a metal selected from the group consisting of Groups I-B, II-B, IV-A, VI-B and VIII and an acid selected from the group consisting of an organosulfonic acid having from 1 to about 50 carbon atoms, and organophosphorus-containing acid having from 1 to about 300 carbon atoms, sulfamic acid and a polyolefinic succinamic acid.

2. The product of claim 1 wherein (1) is first reacted with the polyamine-aldehyde reaction product.

3. The product of claim 1 wherein (2) is first reacted with the polyamine-aldehyde reaction product.

4. The product of claim 1 wherein the said metal is selected from the group consisting of zinc, tin and nickel.

5. The product of claim 4 wherein the said metal is zinc.

6. The product of claim 1 wherein the polyamine is tetraethylenepentamine.

7. The product of claim 1 wherein the aldehyde is butyraldehyde.

8. The product of claim 1 wherein the polyalkenylsuccinic anhydride is polybutenylsuccinic anhydride.

9. The product of claim 1 wherein the metal salt is zinc toluene sulfonate.

10. The product of claim 1 wherein the metal salt is zinc methane sulfonate.

11. The product of claim 1 wherein the metal salt is zinc phenylphosphinate.

12. The product of claim 1 wherein the metal salt is zinc sulfamate.

13. The product of claim 1 wherein the metal salt is zinc methylphenyl phosphate.

14. The product of claim 1 wherein the metal salt is zinc wax benzene sulfonate having about 50 carbon atoms.

References Cited

UNITED STATES PATENTS

| 2,742,498 | 4/1956 | Smith et al. | 260—518 |
| 3,455,832 | 7/1969 | Davis | 252—515 |
| 3,296,130 | 1/1967 | Gee et al. | 252—336 |

TOBIAS E. LEVOW, Primary Examiner

A. P. DEMERS, Assistant Examiner

U.S. Cl. X.R.

44—63, 68, 72; 252—32.5, 33, 33.6, 42.7; 260—326.5 F, 429 R, 429.7, 430, 431, 435 R, 438.1, 439 R